United States Patent Office 3,100,688
Patented Aug. 13, 1963

3,100,688
FOAMED SILICON CARBIDE
Howard M. Dess, Niagara Falls, N.Y., assignor to Union Carbide Corporation, a corporation of New York
No Drawing. Filed Oct. 4, 1961, Ser. No. 142,779
2 Claims. (Cl. 23—208)

This invention relates to a process for the production of foamed silicon carbide.

Silicon carbide is well-known for its chemical inertness, thermal shock resistance, and chemical stability at high temperature. It has been considered for many high temperature applications such as oxidation catalyst supports.

Heretofore, silicon carbide foams have been produced by mixing silica with one of the commonly available foaming reaction systems, and the usual type of foaming reaction carried out. The temperature is then raised so that the organic phase is either burned off or carbonized, leaving behind a porous skeleton of refractory. A further heating at higher temperatures is then required either to sinter the refractory and strengthen it, or to obtain reaction with the carbon in situ to yield finally a strong product.

As a specific example of this type of procedure, one formulation for foamed silicon carbide requires the use of phenol formaldehyde resin, epoxide resin, and isocyanate resin; the isocyanate supplies the foaming action while the other two form the main body of the cellular mass. Fine silica powder is admixed with this organic system and foaming carried out. The foamed system is then heated carefully to partially destroy the organic polymer phase, leaving behind a carbon residue which, at higher temperature, reacts with the silica giving the desired silicon carbide in foamed form.

Processes of this type are generally complicated and require considerable care and attention. The recipe for an isocyanate foam, for instance, involves four components: (1) a high hydroxyl, low-acid number polyester, (2) a molar excess of polyisocyanate, (3) a catalyst, and (4) water. The mixing and foaming technique is vital to the resulting properties. Exact adherence to the process is essential. Certain organic ingredients must be heated slightly before mixing in order to liquify them and to facilitate mixing. Foam stabilizers are likewise required. Further care must be taken not to expose the di-isocyanate mixes to atmospheric moisture as premature gelling occurs.

It is an object of the present invention to provide an improved process for the production of foamed silicon carbide.

Other objects will be apparent from the subsequent disclosure and appended claims.

The process which satisfies the objects of the present invention comprises providing a mixture of carbon and finely-divided elemental silicon powder having an oxidic film; intimately contacting the aforementioned mixture with aqueous hydrofluoric acid to form a stable foam; drying said foam; heating said foam in a non-oxidizing atmosphere to the carbiding temperature without substantial melting of unreacted silicon; and maintaining said foam at said temperature until the carbiding reaction is substantially completed.

As employed herein the term "stable foam" is used to designate a cellulated structure capable of supporting at least its own weight as distinguished from a froth which possesses little or no strength or permanency.

The exact mechanism for the formation of the foam is not certain. It is believed that silicon in the surface oxide layers of the silicon particles reacts with the hydrofluoric acid to evolve hydrogen and to produce silicon tetrafluoride in solution. It is further believed that the silicon tetrafluoride and the oxide film of silicon react with the hydrofluoric acid to produce, in solution, hydrous fluosilicic acid. It has been noted that when the surface layers of the silicon are removed, the underlying substrate is passivated, and reaction stops. It appears that the hydrogen evolved causes the foam formation and rise of foam in the container, to produce a cellulated structure wherein the cell walls are membranes of particles cemented together with a film of hydrous fluosilicic acid.

Commercial grade silicon powder normally containing an exterior oxidic film is not only useful in the process of the present invention, but in fact, is quite superior in reactivity and foam formation and is considered to be far more desirable for the purposes of the present invention than silicon which has less external oxide contamination. High silicon ferrosilicon may be employed but some refractoriness will be sacrificed.

The carbon employed in the present invention may be suitably lampblack or thermatomic carbon. Other finely divided carbons will also be suitable.

The concentration of the hydrofluoric acid may vary from 1 to 100 percent although dilute aqueous hydrofluoric acid is superior. As employed herein "dilute aqueous hydrofluoric acid" refers to an acid having a concentration from about 2 percent to about 20 percent.

A great deal of freedom is available in varying the proportions of reactants. Normally, the silicon and carbon should be in about stoichiometric proportions for the formation of silicon carbide, SiC. However, the proportions of silicon may exceed stoichiometric; the resulting foam may be carbided in a stream of nitrogen, or subjected to nitrogen at an elevated temperature after carbiding, to provide a mixed silicon carbide-nitride foam. No particular advantage results from employing a stoichiometric excess of carbon; the final product will lack the strength of the stoichiometric product. The quantity of hydrofluoric acid employed depends on the nature of the product desired; if too little is employed, the foaming action will be retarded and the final product will have a higher apparent density than if greater amounts are employed. In normal practice, however, the quantity should be substantially less than that necessary to react with all of the silicon in the mixture in order that unreacted silicon particles will be available with the carbon to contribute to the foam structure.

There is no criticality with respect to the sequence of combining the silicon-carbon mixture and hydrofluoric acid. However, it may be suitably accomplished by adding the dilute acid to the dry mixture in a suitable acid resistant container. An equally suitable method comprises forming an aqueous slurry of the silicon carbon mixture and subsequently adding dilute acid to the slurry. When a slurry is employed, anhydrous hydrofluoric acid may be employed by bubbling it through the slurry.

Upon the conclusion of the foam formation, the foam is permitted to dry. This may be accomplished by air drying at room temperature or by placing the foam mixture in a suitable drying oven. Heating at 60° C. to 120° C. is quite suitable.

In determining the desirable particle size of the silicon and carbon, the ratio of the diameter of the particle to the thickness of the cell wall of the cellulated or foamed product must be considered. It has been found, therefore, that for efficient carbiding as well as for the formation of a strong cellulated structure the powders should have a maximum particle size of about 325 mesh.

After drying, the foamed silicon-carbon mixture is then converted to silicon carbide (SiC) by heating said mixture to high temperature in a non-oxidizing atmosphere in any suitable furnace. In carrying out the reaction, care must be taken not to exceed the melting point of elemental silicon (1410° C.) during the initial stages of heating. This occurrence may easily be avoided if the temperature is held constant for approximately one hour after which the temperature is raised to approximately 2200° C., for final conversion to a well-bonded product. After a convenient holding period of from ½ hour to 1 hour, the power is shut off.

The resulting product is substantially pure silicon carbide characterized by a multiplicity of adjacent spaces or voids resembling a solidified foaming mass. The product is very strong compared to the original silicon-carbon foam.

In fabricating articles from the material of the present invention, it is most advantageous to form them of the dried foam prior to carbiding. The dried foam can be readily cut into any convenient shape and is easily handled. Upon carbiding the shapes become relatively hard and rigid.

In an example of the invention a silicon carbide foam was prepared by treating a stoichiometric mixture of through 400 mesh silicon powder and thermatomic carbon with an equal weight of 4 percent hydrofluoric acid solution.

A foam having a uniform pore structure was produced; the foam was dried by exposure to air at 110° C. The dried foam was heated in argon to 1400° C. in about 2 hours, held at 1400° C. for an hour, heated to 1500° C. in about ½ hour, held at 1500° C. for an hour, and then heated to 1850° C. in about ½ hour. The original silicon-and-carbon foam was converted to a foamed structure of silicon carbide, SiC. The apparent or bulk density of the product was substantially below 20 lbs./cu. ft. As employed herein, "apparent" or "bulk" density refers to the ratio of the weight of the materials to its total volume (including open and closed pore space).

What is claimed is:

1. A process for the production of foamed silicon carbide which comprises providing a finely divided mixture of carbon and elemental silicon powder; intimately contacting said mixture with aqueous hydrofluoric acid to form a stable foam said hydrofluoric acid being in an amount substantially less than stoichiometric for reaction with the silicon in the mixture; drying said foam; heating said foam in a non-oxidizing atmosphere to initiate the silicon carbide-forming reaction without substantial melting of unreacted silicon and continuing heating said foam until substantial completion of the carbiding reaction.

2. A process in accordance with claim 1 wherein the proportions of silicon and carbon in the mixture are about stoichiometric for the formation of silicon carbide and wherein the aqueous hydrofluoric acid has a concentration of about 4 percent and is in an amount about equal by weight to the carbon-silicon mixture.

References Cited in the file of this patent

UNITED STATES PATENTS

| | | |
|---|---|---|
| 2,431,326 | Heyroth | Nov. 25, 1947 |
| 2,942,951 | Wright et al. | June 28, 1960 |